United States Patent [19]

Yamine

[11] 4,071,336

[45] Jan. 31, 1978

[54] GAS AND VAPOR SEPARATOR

[76] Inventor: Anthony S. Yamine, 4679 Pardee Road, Dearborn Heights, Mich. 48125

[21] Appl. No.: 636,538

[22] Filed: Dec. 1, 1975

Related U.S. Application Data

[63] Continuation of Ser. No. 433,187, Jan. 21, 1974, abandoned.

[51] Int. Cl.² .............................................. B01D 53/06
[52] U.S. Cl. ........................................ 55/203; 55/390; 55/406; 55/DIG. 28; 55/DIG. 30
[58] Field of Search ................... 55/196, 208, 390, 77, 55/78, 181, 203, 314, 400, 401, 406, DIG. 28, DIG. 30, 317, 338; 210/502

[56] References Cited

U.S. PATENT DOCUMENTS

| | | | |
|---|---|---|---|
| 1,481,221 | 1/1924 | Nuss ........................................ 55/78 |
| 2,081,406 | 5/1937 | Mazza ................................... 55/17 X |
| 2,889,007 | 6/1959 | Lunde .................................... 55/317 |
| 2,941,872 | 6/1960 | Pilo et al. ............................ 55/400 X |
| 3,078,647 | 2/1963 | Mosier ................................... 55/197 |
| 3,126,263 | 3/1964 | Schwab ............................. 55/408 X |
| 3,183,649 | 5/1965 | Teller ................................. 55/390 X |
| 3,492,980 | 2/1970 | Beck ............................. 55/DIG. 30 |
| 3,590,629 | 7/1971 | Courbon ........................... 55/400 X |
| 3,683,597 | 8/1972 | Beveridge ...................... 55/DIG. 28 |
| 3,903,694 | 9/1975 | Aine ............................... 55/DIG. 30 |

FOREIGN PATENT DOCUMENTS 532,467   1/1941   United Kingdom ................... 55/400

Primary Examiner—John Adee
Attorney, Agent, or Firm—Irving M. Weiner; Pamela S. Austin

[57] ABSTRACT

A gas and vapor separator includes an axial fan with blade members which carry an absorbing material. A power means, such as an electric motor, rotates the fan, which causes the adulterated fluid to pass through the apparatus. As the fan blades contact the fluid, the desiccant material absorbs the undesirable elements in the fluid and simultaneously expels the cleansed fluid. The centrifugal force which acts on the absorbed matter causes said matter to radially translate in an outwardly fashion into a circular collector which entraps and retains the absorbed matter. The desiccant material is thereby continuously purged and capable of continuously cleansing the adulterated fluid.

9 Claims, 14 Drawing Figures

GAS AND VAPOR SEPARATOR

This is a continuation of application Ser. No. 433,187, filed Jan. 21, 1974, now abandoned.

The present invention relates to an apparatus for treating gases. In particular, the invention relates to gas and vapor separators.

BACKGROUND OF THE INVENTION

The present invention relates to the field of gas and vapor separators. It is well known that water vapor can be removed from air by a variety of methods including compression, refrigeration, heat and absorbing materials. The present invention relates particularly to gas and vapor separators which employ absorbing materials. In such processes the absorbing material must be reactivated (i.e., purged of the absorbed matter) on either a periodic or continuous basis. A typical method of purging the absorbing material is thermal reactivation. These prior art methods of reactivation are very inefficient and therefore waste great quantities of our country's limited energy resources.

The present invention overcomes the above-described deficiencies of the prior art by providing a novel apparatus for separating gases and vapors which is simple in design, can be inexpensively manufactured, and efficiently operated.

SUMMARY OF THE INVENTION

The present invention provides an apparatus for treating gases. The apparatus includes a rotating member which carries a desiccant material. The apparatus also includes power means which are operably connected to said rotating member for rotating the rotating member.

The present invention also provides a gas and vapor separator for removing vapors and gaseous elements or compounds from a gaseous adulterated fluid. The apparatus is comprised of an axial fan with blade members which carry an absorbing material. There are several well known desiccants, or absorbing agents such as silica gel, alumina gel, anhydrous calcium sulphate, and the like which can be employed with the present invention. The choice of a particular desiccant will depend upon the nature, quantity, and quality of both the adulterated gas and the vapors and gases to be removed therefrom. A power means, such as an electric motor, rotates the fan causing the gas to flow through the apparatus. As the fan blades contact the fluid, the desiccant material absorbs the predetermined vapors and gases to be removed and simultaneously expels the cleansed fluid. The rotation of the fan creates a centrifugal force which acts on the absorbed matter. Said force causes the matter to translate outwardly, in a radial direction, into a collector which entraps and retains the matter. The desiccant material is thereby purged and capable of continuously cleansing the adulterated fluid.

Other objects and advantages of the present invention will appear from the following description and appended claims, reference being had to the accompanying drawings forming a part of this specification wherein like reference characters are intended to designate corresponding parts in the several views.

DETAILED DESCRIPTION OF SOME PREFERRED EMBODIMENTS OF THE PRESENT INVENTION

Before explaining the present invention in detail, it is to be understood that the present invention is not limited in its application or uses to the details of construction and arrangement of parts illustrated in the accompanying drawings, because the present invention is capable of other embodiments, variations and modifications, and of being practiced or carried out in various ways. Furthermore, it is to be understood that the phraseology or terminology employed herein is for the purpose of description and illustration only, and not for the purpose of limitation.

Figure 1:
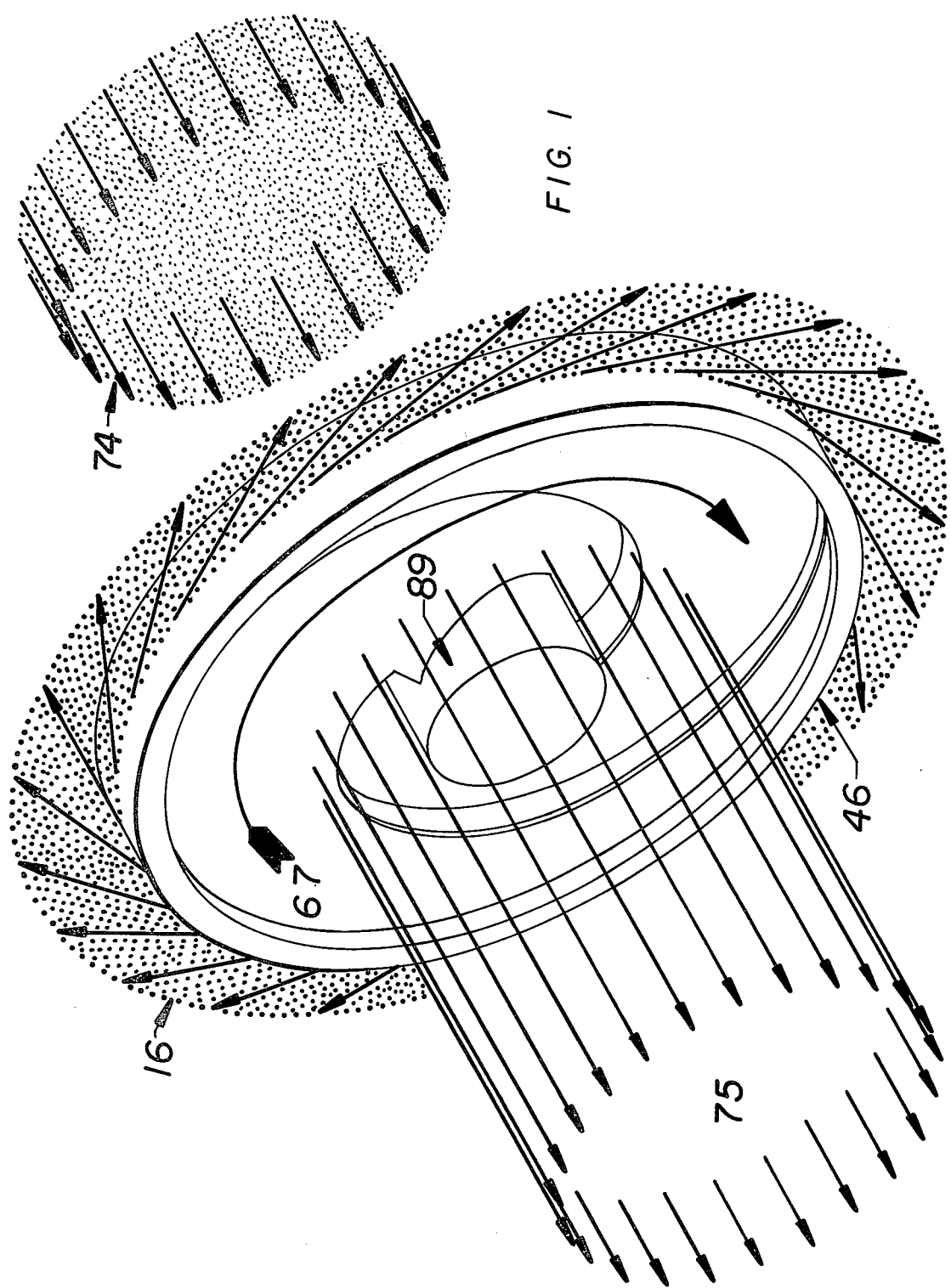
FIG. 1 is a perspective view of the gas and vapor separator with a spiral-shaped blade member.

With reference to FIG. 1 of the drawings, there is shown a first embodiment of the separator apparatus wherein a fan hub 89 is provided for attachment to any standard rotating power means (not shown). A fan blade 67 is attached to the hub 89, and carries a desiccant material. The blade 67 can be constructed of a solid, molded desiccant material or the desiccant material can be bonded to a blade manufactured of commonly known materials, such as metal or plastic. The blade 67 is spiral-shaped, thereby providing increased desiccant surface area exposure to the adulterated gas. A reinforcing rim 46 is attached to the blade's 67 periphery, and is concentric with hub 89. When the apparatus is rotated, the adulterated gas 74 is caused to contact the desiccant on blade 67 which absorbs the predetermined gases and vapors. The cleansed gas 75 is simultaneously expelled. The absorbed matter, or absorbates 16, under the influence of centrifugal force is radially discharged. The nature of the absorbates 16 will depend upon the nature, quantity, and quality of the adulterated gas, as well as the type of desiccant material chosen.

Figure 2:
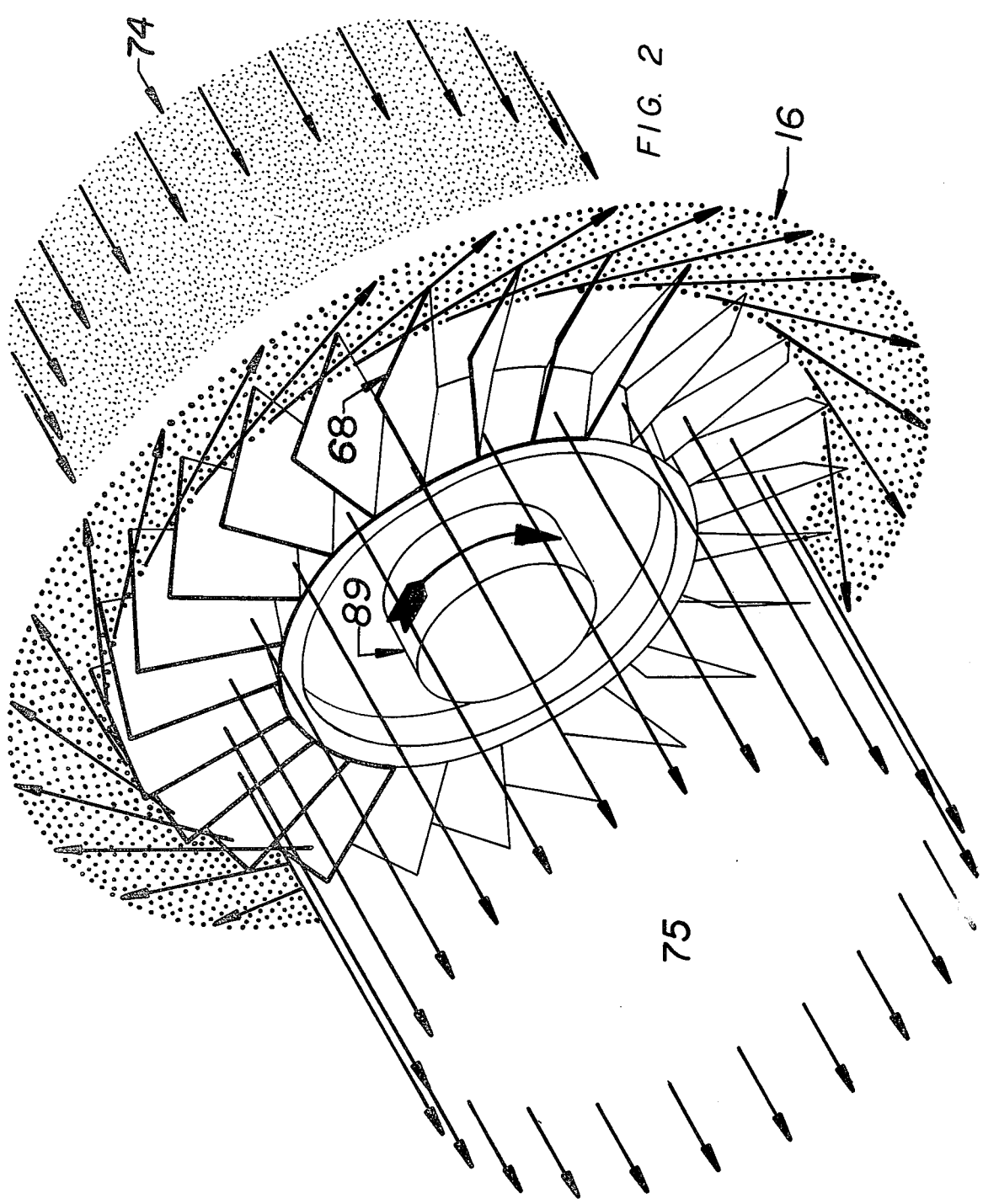
FIG. 2 is a perspective view of the apparatus in a second embodiment of which includes a plurality of radially extending turbine-like blades.

In FIG. 2 there is shown a second embodiment of the separator apparatus wherein the fan hub 89 is attached to a plurality of radially-extending turbine-like blades 68. The blades 68 are constructed of, or coated with, the desiccant material. The adulterated gas 74 is drawn into contact with the blades 68 upon rotation of the apparatus. The predetermined gases and vapors are absorbed by the desiccant, the absorbates 16 are radially discharged at the tip of each blade 68, and the cleansed gas 75 is axially expelled.

Figure 3:
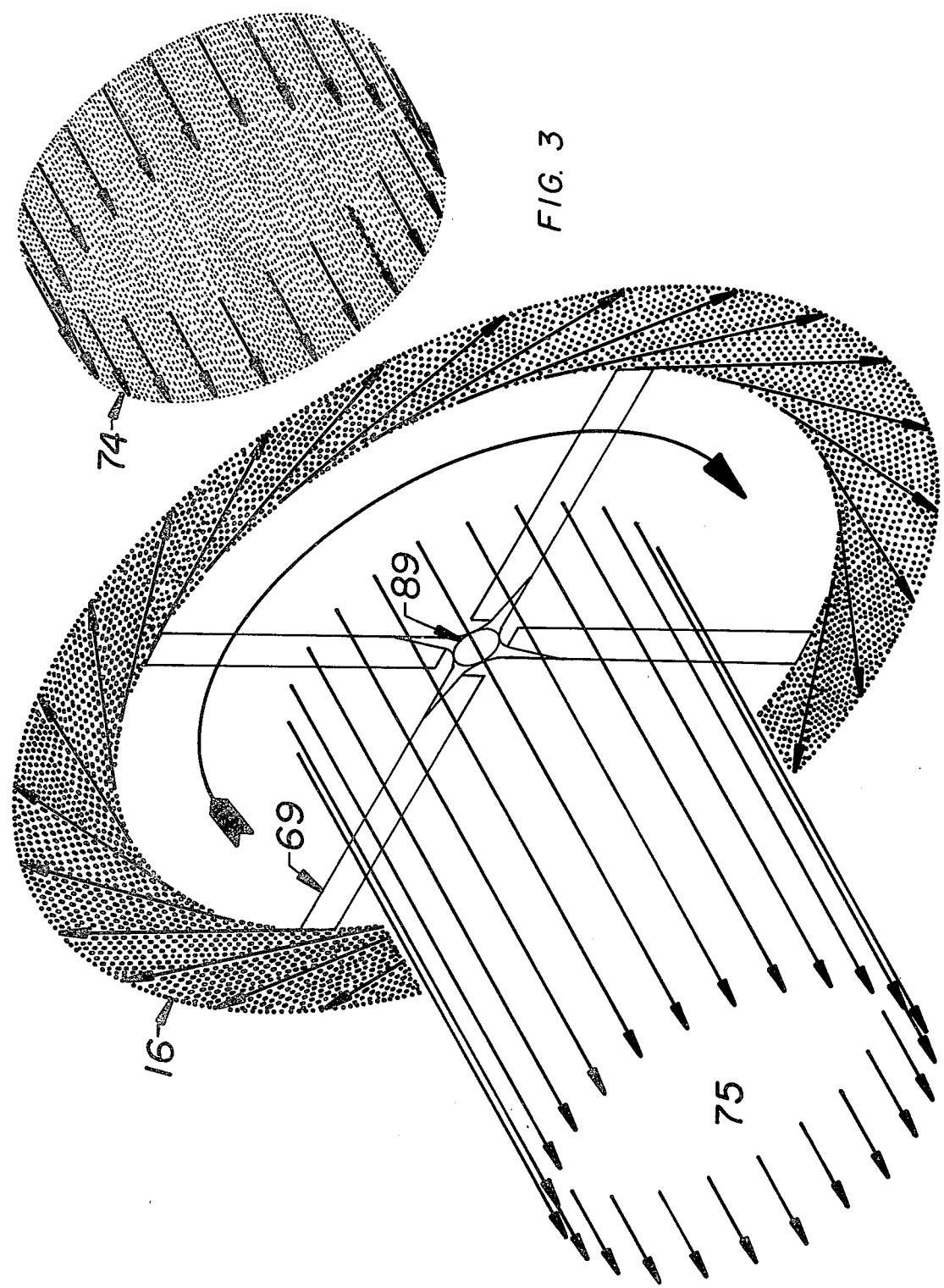
FIG. 3 is a perspective view of the apparatus in a third embodiment which includes a plurality of propeller-like rotor blades.

In FIG. 3 there is shown a third embodiment of the separator apparatus wherein the fan hub 89 is attached to a plurality of propeller-like rotor blades 69. The blades 69 are constructed of, or coated with, the desiccant material. Like the second embodiment of the present invention, the adulterated air 74 is drawn into contact with the blades 69 upon rotation of the apparatus. The predetermined gases and vapors are absorbed by the desiccant, the absorbates 16 are radially discharged at the tip of each blade 69, and the cleansed gas 20 is axially expelled.

Figure 4:
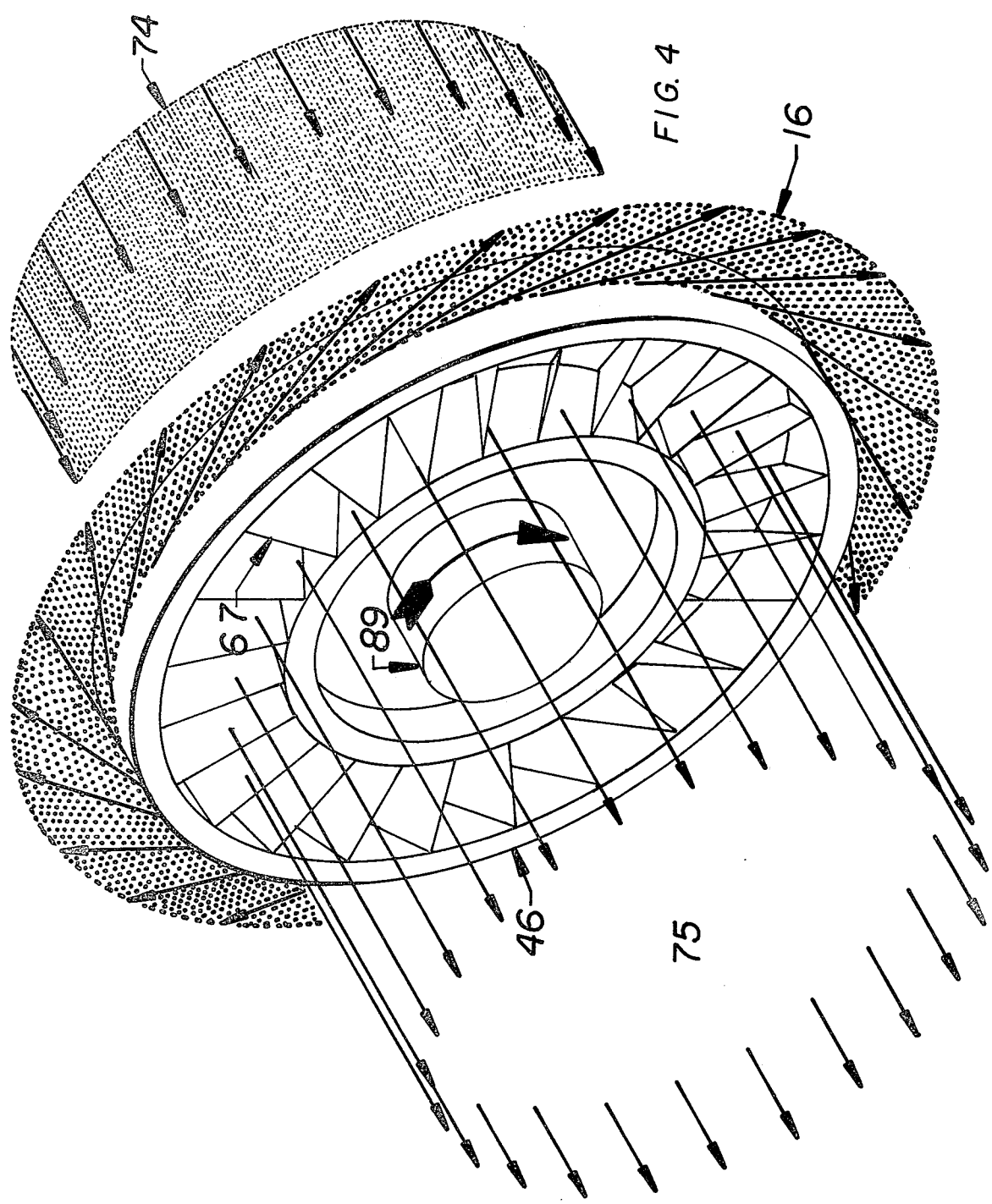
FIG. 4 is a perspective view of the apparatus in a fourth embodiment which includes a plurality of radially extending turbine-like blades and an outer reinforcing ring.

In FIG. 4 there is shown a fourth embodiment of the separator which includes a plurality of radially-extending, turbine-like blades 67 and an outer reinforcing ring 46. The blades 67 are constructed of or coated with the desiccant material. A reinforcing rim 46 is attached to the blades' periphery, and is concentric with hub 89.

The adulterated gas 74 is drawn into contact with blades 67 upon rotation of the apparatus. The absorbates 16 are radially discharged from the exterior surface of reinforcing ring 46 and the cleansed gas 75 is expelled axially.

Figure 5:
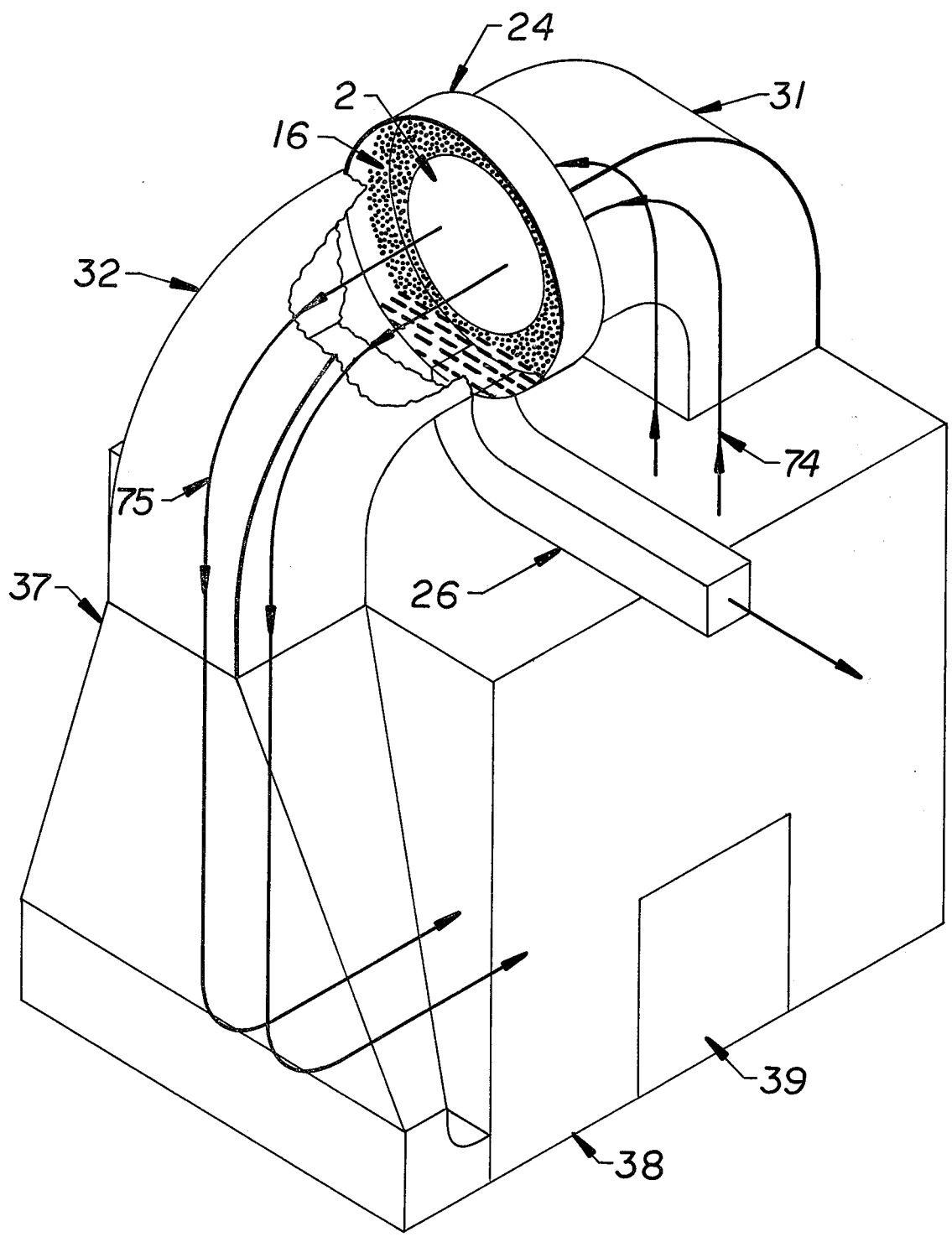
FIG. 5 is a perspective view of a gas and vapor separating system which includes the separator apparatus and a hermetically sealed processing chamber.

FIG. 5 shows a gas and vapor separating system which includes the separating apparatus, generally designated 2 (as previously described in preferred embodiments one, two, three or four) and a hermetically sealed processing chamber 38. The processing chamber 38 is provided with an access door 39, through which articles may be placed into, and removed from, the chamber. Upon rotation of the separator fan 2, adulterated gas 74 is drawn from the chamber 38, through admission duct 31, to said separator. In the previously described manner, the predetermined gases and vapors are removed from the adulterated gas 74, and the cleansed gas 75 is expelled through outlet duct 32 into the processing chamber 38. The aforementioned articles (not shown) are thusly exposed to the cleansed gas atmosphere which is continuously being recycled and re-cleansed. A circular collector 24 is provided about the periphery of separator apparatus 2, which entraps the radially translating absorbates 16 and discharges them through evacuating spout 26. The absorbates 16 are then disposed of in any conventional manner.

The vapor separating system is particularly adapted for pharmaceutical and food processing operations which require a sterile and/or dehumidified processing atmosphere.

Figure 6:
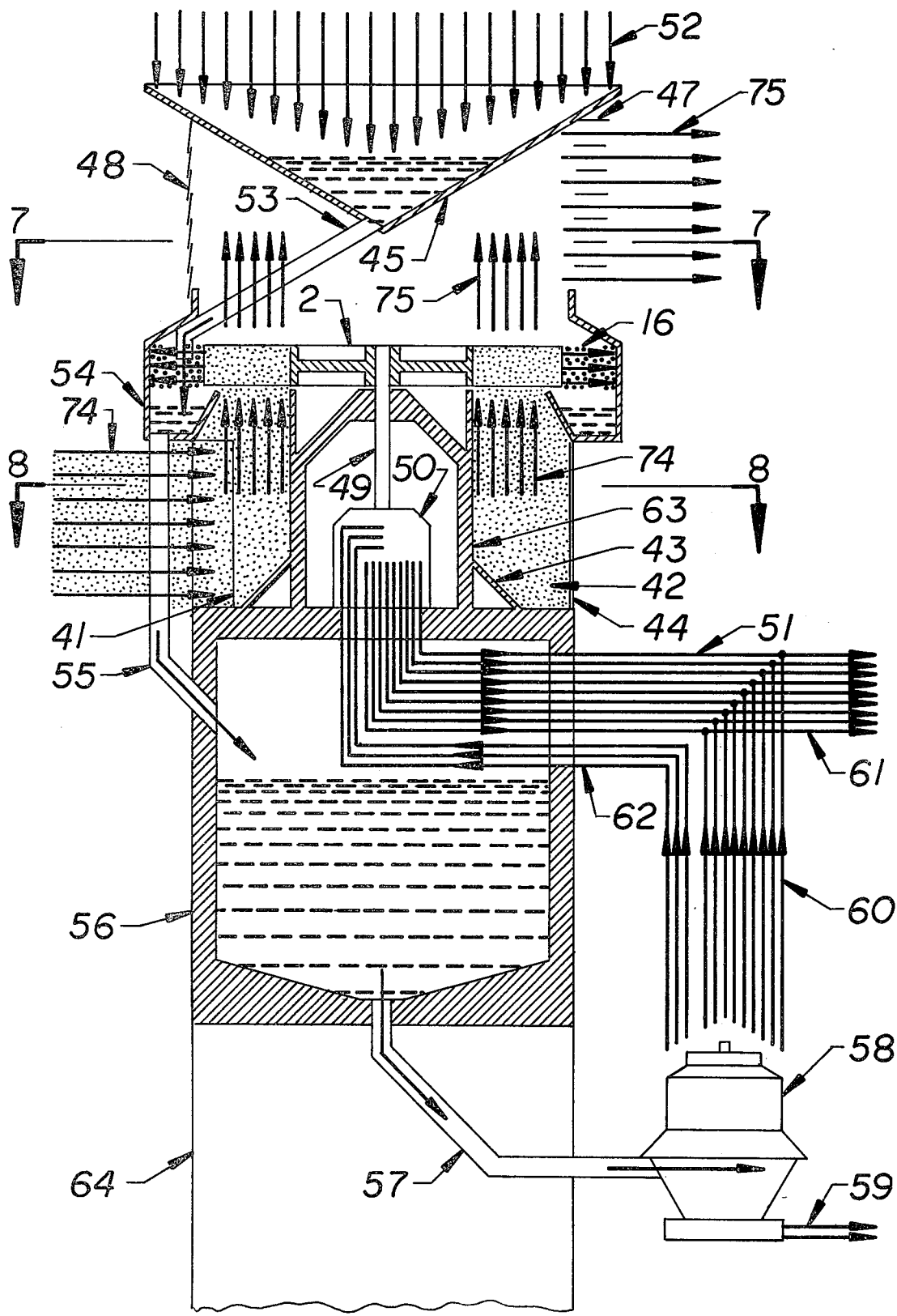
FIG. 6 is a schematic sectional drawing of a devaporizer windmill embodiment.
Figure 7:
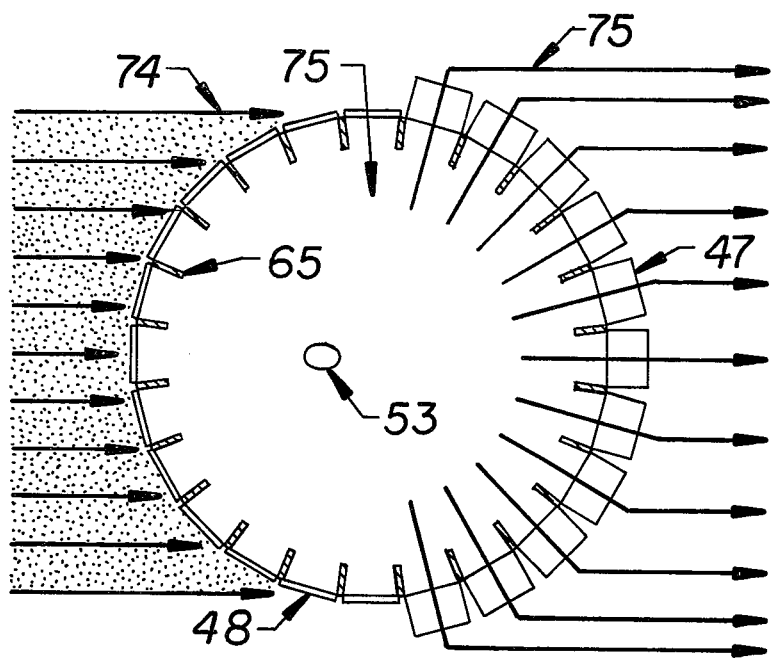
FIG. 7 is a sectional view of the apparatus in FIG. 6 taken along line 7—7.
Figure 8:
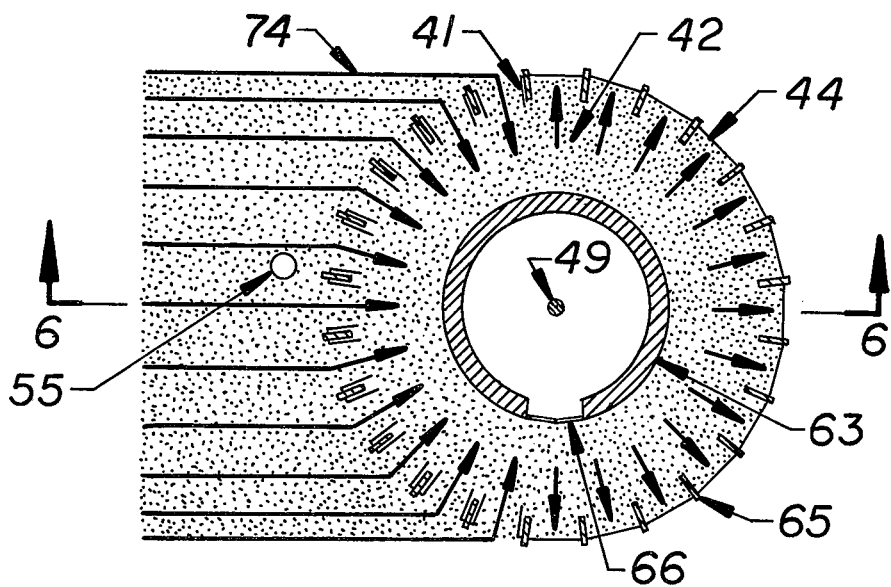
FIG. 8 is a sectional view of the apparatus in FIG. 6 taken along line 8—8.

FIGS. 6, 7 and 8 show a devaporizer-windmill embodiment of the separator apparatus. In essence, the separator functions as a vertical, wind-powered, electric generator which dehumidifies the throughgoing air and collects the resulting moisture for the purposes of powering a hydroelectric generator.

The devaporizer-windmill is provided with an atmospheric air admission section as shown in FIG. 8. The admission section has a circular cross section, and is provided with a plurality of doors 41 and 42 about its periphery. Each door is independently operable by means of a vertical, inwardly opening hinge. The pressure of the inblowing air 74 forces windward doors 41 open and retains leeward doors 44 in their closed position. The entrapped air is thereby caused to flow upwardly by deflector 43 through the blades of the separator apparatus 2. The onrushing air rotates the separator 2 and the motor-generator 50 which is attached thereto by driveshaft 49. The air is dehumidified in the manner previously described, and directed by air deflector 45 into the exit section shown in FIG. 7. The air exit section has a circular cross section and has a plurality of overhung, overlapping louver doors. The windward exit doors 48 are kept closed by the pressure of the atmospheric air 74, while the leeward exit doors 47 are forced open by the pressure of the exiting dehumidified air 75.

The devaporizer-windmill is provided with a soft water reservoir 56, which along with the devaporizer windmill is preferably positioned a substantial altitude above sea level so as to create sufficient head to operate hydroelectric generator 59, which is connected thereto by pipe 57. The exterior surface of air deflector 45 forms a cone-shaped collector for rain water 52 and is connected by rain spout 53 to soft water stream 54 which surrounds the separator apparatus 2 and collects the absorbates 16 discharged therefrom. The soft water stream 54 is in turn connected to soft water reservoir 56, by water duct 55.

Figure 9:
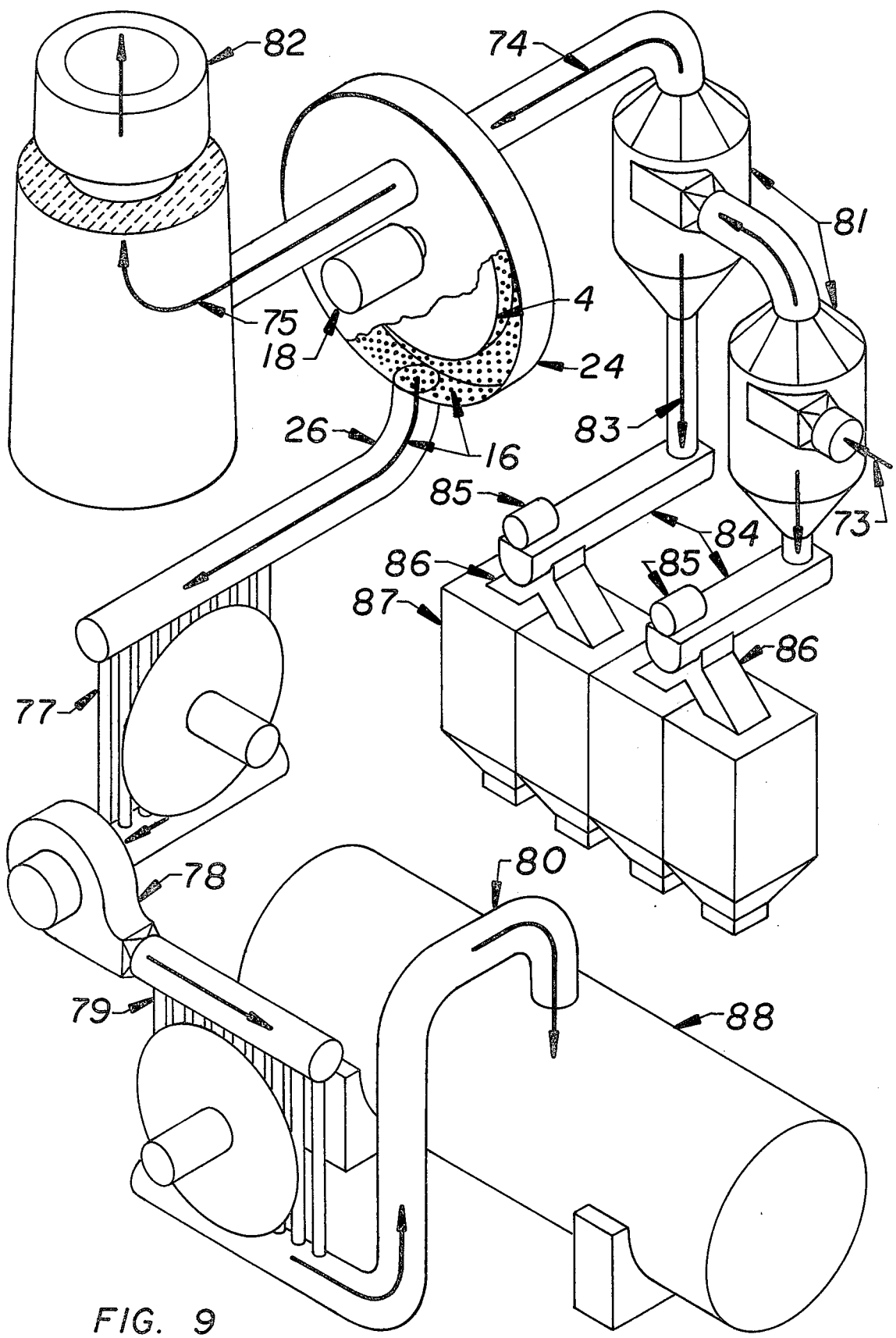
FIG. 9 is a schematic drawing of a smoke stack emissions purging system.

FIG. 9 shows a smoke stack emissions purging system. Crude emissions 73 are directed into a pair of cyclone dust collectors 81 which are connected in a series relationship. The particles 83 collected by dust collectors 81 are transported by a conventional screw conveyor 84 and motor 85, through discharge chutes 86, into dust storage bins 87. The dust-free emissions 74 are then directed to the separator apparatus which includes desiccant impeller blade 4 which is rotated by a power means 18, such as an electric motor. The cleansed gas 75 is discharged into the atmosphere through stack 82, while the absorbates are directed through low pressure gas pipe line 26 to low pressure gas pre-cooler 77. The low pressure gas pre-cooler 77 is attached to high pressure gas compressor 78 and high pressure gas aftercooler 79 which concentrate the absorbates, which through pipe 80 are stored in tank 88.

Figure 10:
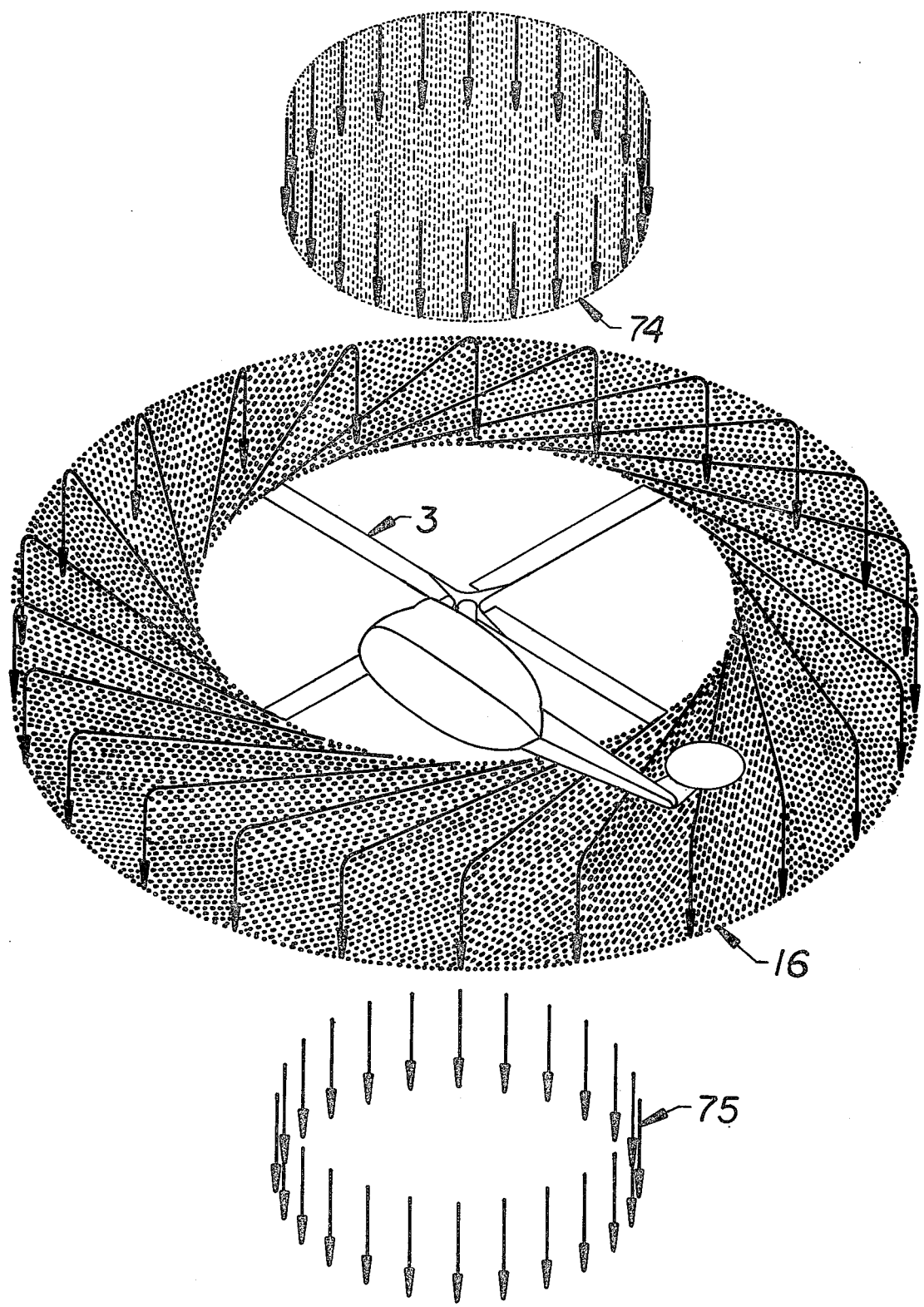
FIG. 10 is a schematic drawing of a gas and vapor separator propeller for defogging, as attached to a helicopter type of aircraft.

FIG. 10 shows a gas and vapor separator propeller blade for defogging. The propeller 3 is constructed of or coated with the desiccant material. Humid air 74 is drawn into contact with propeller 3 upon rotation thereof. The moisture, as well as other absorbates is radially discharged, while the cleansed air 75 is propelled downwardly thereby defogging the area.

Figure 11:
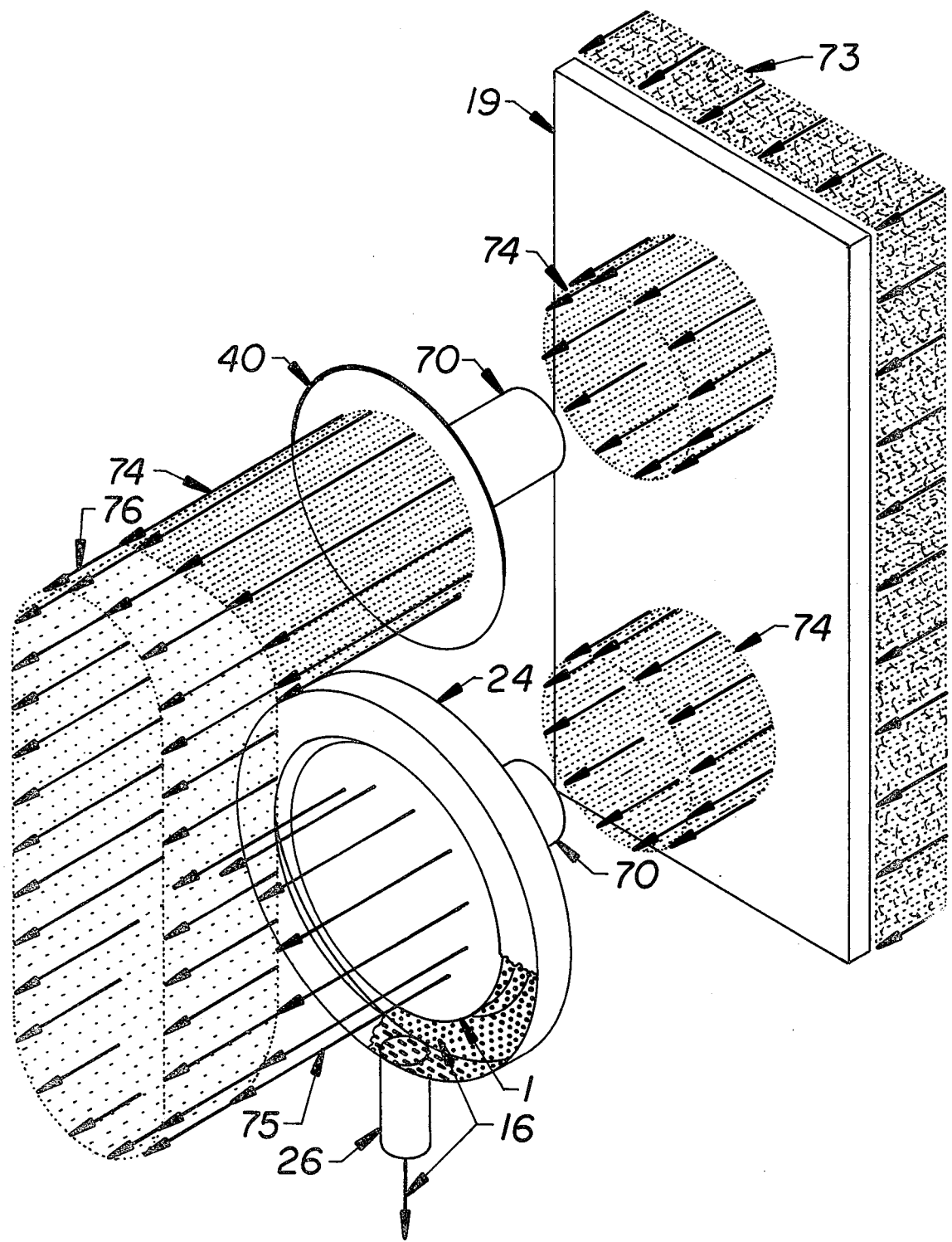
FIG. 11 is a schematic drawing of a dehumidifying embodiment of the apparatus.

FIG. 11 shows a dehumidifying embodiment of the gas and vapor separator apparatus. A commercially standard air filter 19 preconditions the adulterated gas 73 by removing suspended particles therefrom, so as to prevent the fogging of the desiccant material. A standard fan, 40 which is rotated by a power means, such as variable speed electric motor 70, draws adulterated gas 73 through air filter 19. The gas and vapor separator 1, powered by variable speed motor 70 is positioned adjacent to fan 40. Filtered air 74 is drawn into contact with the desiccant material of separator 1 and the absorbates 16 are radially expelled into collector 24 and discharged through evacuating spout 26. The cleansed gas 75 is axially discharged, and combines with filtered air 74 to form conditioned air 76. The relative speed of fan 40 and separator 1 can be varied to accomplish the degree of air conditioning desired.

Figure 12:
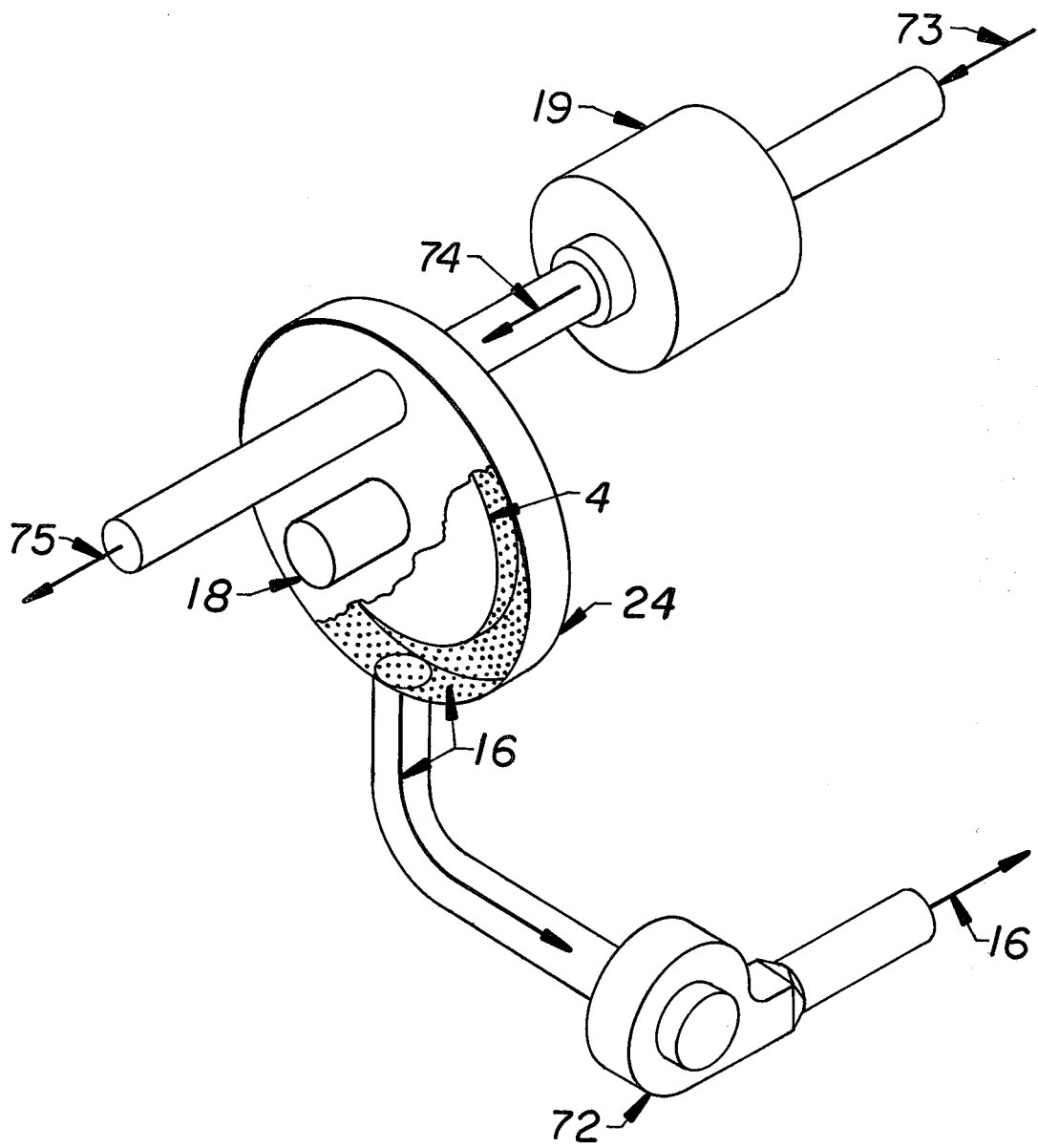
FIG. 12 is a schematic drawing of an internal combustion engine emission purger.

FIG. 12 shows an internal combustion engine emissions purger comprising an emissions filter 19 and the separator apparatus. Exhaust gases 73 pass through filter 19 which removes suspended particles, such as ash. The filtered air 74 is then directed to the separator apparatus where the desiccant carrying impeller 4 absorbs the predetermined gases and vapors and radially expels the absorbates 16 into collector 24. The absorbates 16 are removed from collector 24 by feed-back blower 72, and may be recycled through the engine to promote the complete combustion of the exhaust gases. The separator can be powered by the pressure of the exhaust gases 73 when engine speed is sufficient to produce such pressure. Motor 18 is provided to power the separator when said exhaust pressures are not adequate to rotate the separator impeller 4. A vacuum operated electrical switch can be used to control the operation of motor 18. The cleansed gases 75 can then be directed to a conventional noise abatement apparatus.

Figure 13:
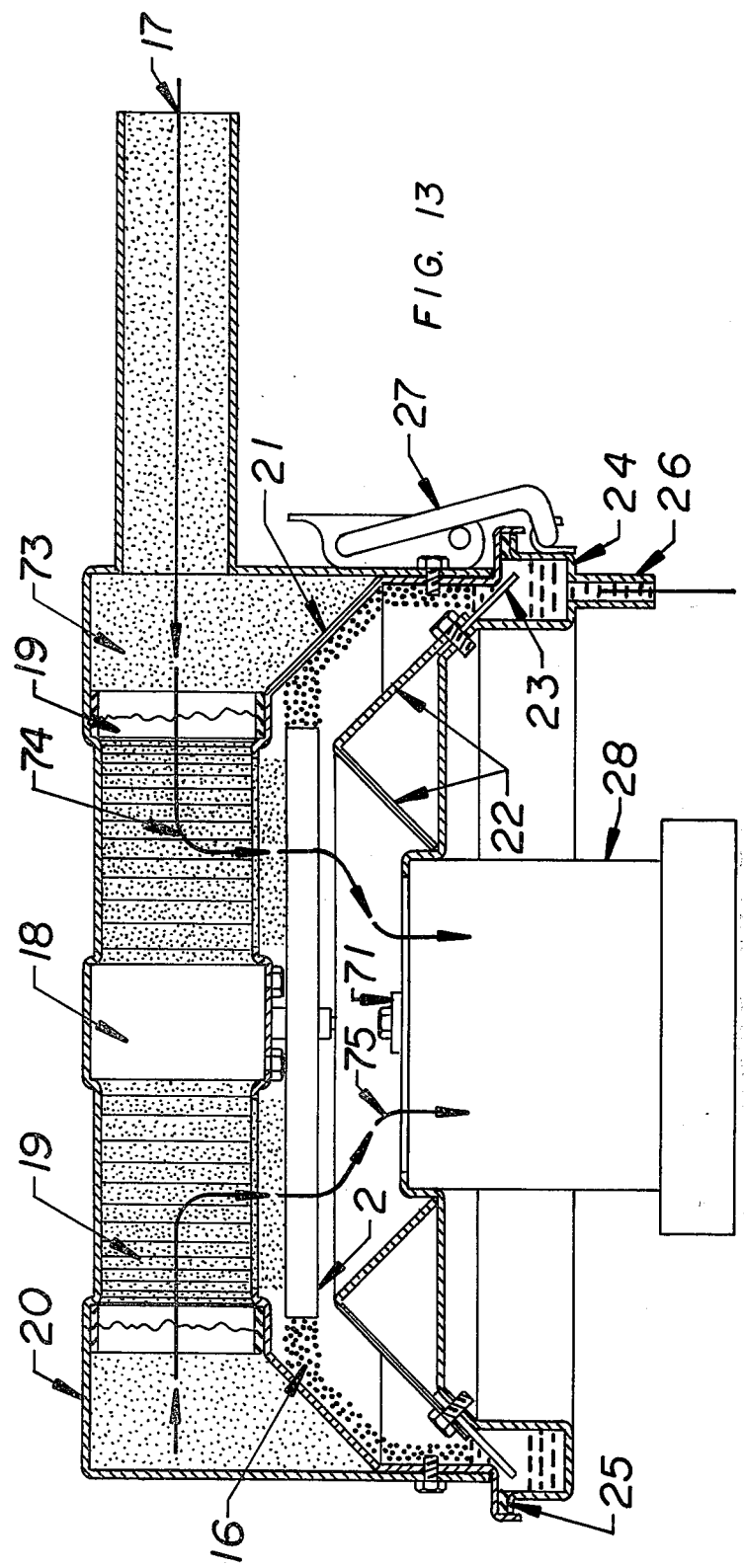
FIG. 13 is a sectional view of a dehumidifying embodiment for use with internal combustion engine carburation.

FIG. 13 shows a dehumidifying embodiment of the present invention for use in internal combustion engine carburation. Atmospheric air 73 passes through air inlet 17 to the dehumidifying apparatus. A conventional air filter 19 disposed above the separator 2, removes particles from the atmospheric air 73. The filtered air 74 is directed through separator apparatus 2 which is powered by motor 18, when air flow is insufficient to permit air powered rotation. A vacuum operated electrical switch can be used to control the operation of motor 18. Absorbates 16 (moisture) are radially expelled from the separator 2 onto moisture deflector 21, which directs the absorbates into collector 24. An air trap 23, disposed between moisture deflector 21 and collector 24, extends from vapor separator 22 so as to prevent the absorbates from recombining with the dehumidified air 75. An evacuating spout 26 is provided on the lower portion of collector 24 for discharging the absorbates. The dehumidified air 75 is directed into carburator 28 by the inner portion of vapor separator 22.

Figure 14:
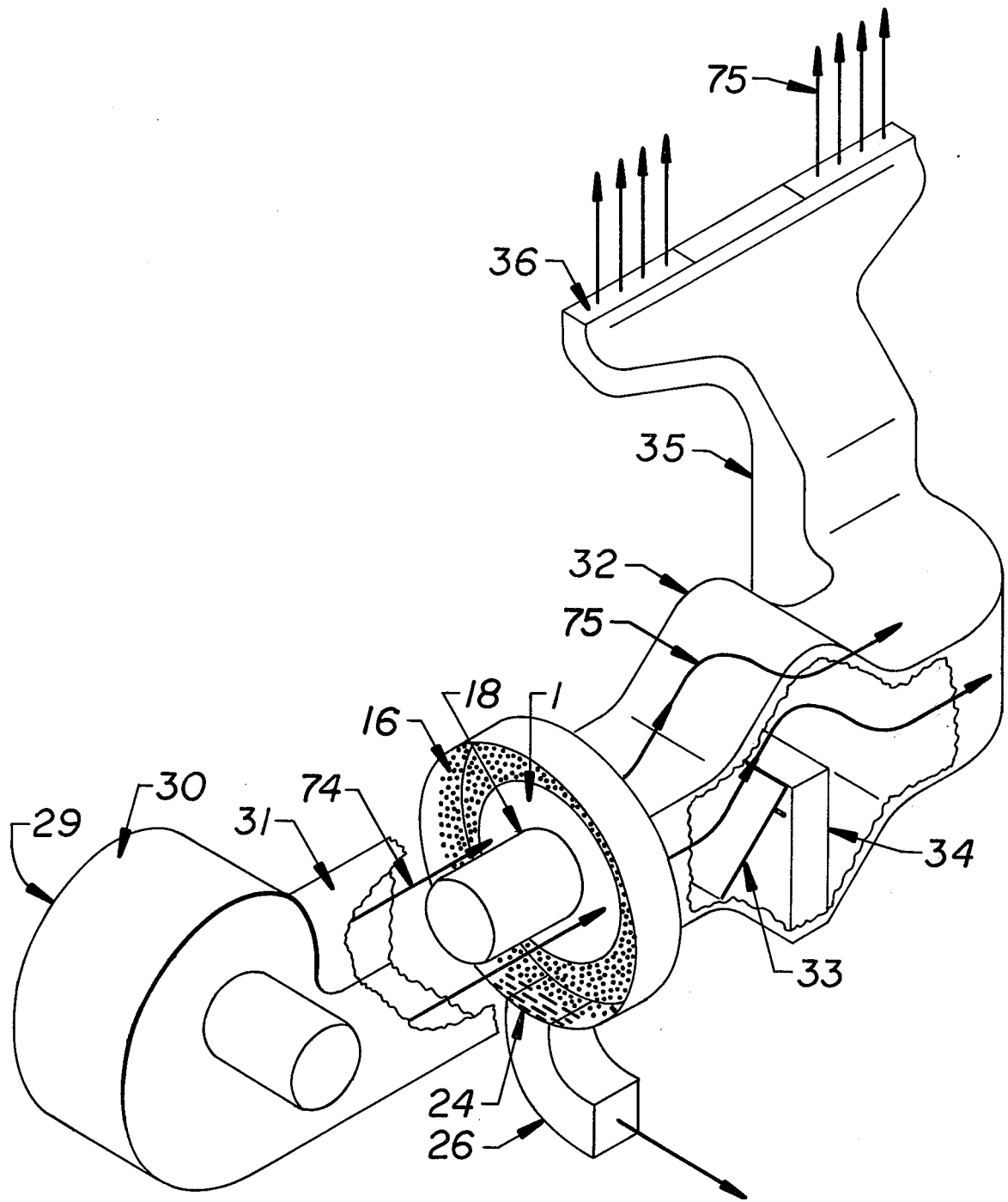
FIG. 14 is a schematic drawing of a windshield defogger embodiment of the separator apparatus.

FIG. 14 shows an automobile windshield defogger embodiment of the separator apparatus. In a vehicle's standard heating and defogging system, a blower 30 draws air 29 from an internal or external source. The exiting blower air 74 is directed through duct 31 to the heater core 34 where said air is heated, and then conducted to the windshield defogger outlets 36. In the present embodiment, the separator apparatus is disposed between the blower 30 and the heater core 34. The exiting blower air 74 is drawn through separator fan 1, which is powered by motor 18. The desiccant material absorbs the water vapor in said air and expels the dehumidified air 75 into heater duct 52. The absorbate, water vapor 16, is radially discharged into collector 24 which is attached to evacuating spout 26. The dehumidified air 75 is then heated by heater coil 34 and conducted to the windshield defogger outlets 36.

It will be evident from the description set forth hereinabove that there is herein provided novel apparatus which satisfies all of the objects of the present invention, as well as others, including many advantages of great practical utility and commercial importance.

Furthermore, because many embodiments may be made of the inventive concept hereindescribed, and because many modifications and variations may be made of the particular embodiments hereinbefore shown and described, it is to be understood that all matter herein is to be interpreted merely as illustrative, and not in a limiting sense.

It is to be understood that changes may be made in the concept, provided that such changes fall within the scope of the appended claim.

What I claim is:

1. An apparatus for treating gases, comprising, in combination:

a rotating member including a hub member and a blade member, said blade member being attached at its innermost portion to said hub and carrying a desiccant material for absorbing absorbates of any specific gravity from incoming gases to be treated;

and power means operably connected to said hub member for rotating said rotating member at a high speed to propel axially a flow of gases purged of said absorbates and simultaneously to divert by centrifugal force radially and outwardly only said absorbates in said desiccant material to reactivate and purge said desiccant material without any external gas-propelling means, without any desiccant thermal re-activating means, and without any oxidizing means.

2. An apparatus in accordance with claim 1, including:

a collector disposed about the radially outermost portion of said rotating member for gathering absorbates which are purged from said desicant material by centrifugal force only.

3. An apparatus in accordance with claim 1 including:

an outer ring member which is attached to the outermost portion of said blade member, and which is concentric with said hub member.

4. An apparatus in accordance with claim 1, wherein:

said blade member is of a one-piece, spirally apertured construction.

5. An apparatus in accordance with claim 1, wherein:

said blade member comprises a plurality of radially extending, turbine-like blade portions.

6. An apparatus in accordance with claim 1, wherein:

said blade member comprises a plurality of radially-extending propeller-like, rotor blade portions.

7. An apparatus according to claim 2, wherein said gases to be treated comprises the exhaust gases of an internal combustion engine, including:

an emissions filter through which said exhaust gases are passed to remove suspended particles therefrom;

a conduit for conveying the filtered exhaust gases to said rotating member;

said power means comprises a vacuum-operated electrical motor;

a feed-back blower;

a conduit connected between said collector and said feed-back blower for removing said absorbates from said collector;

and a conduit connecting said feed-back blower and said internal combustion engine for recycling said absorbates through said engine to promote the complete combustion thereof.

8. An apparatus according to claim 1 wherein said gases to be treated comprises atmospheric air, including:

an air filter through which said atmospheric air is passed to remove particles from said atmospheric air;

means for conveying the filtered atmospheric air to said rotating member;

said power means comprises a vacuum-operated electrical motor;
a collector for said absorbates;
a deflector disposed between said rotating member and said collector for directing said absorbates into said collector;
an air trap operably exposed between said deflector and said collector;
an evacuating spout operably connected to said collector for discharging said absorbates;

a carburetor for an internal combustion engine;
and means for conveying said axial flow of gases purged of said absorbates to said carburetor.

9. Am apparatus according to claim 1, wherein:
said incoming gases to be treated comprise humid air;
said rotating member comprises the propeller of a conventional helicopter; and
said absorbed absorbates of any specific gravity include moisture absorbed from said humid air.

* * * * *